Patented May 3, 1927.

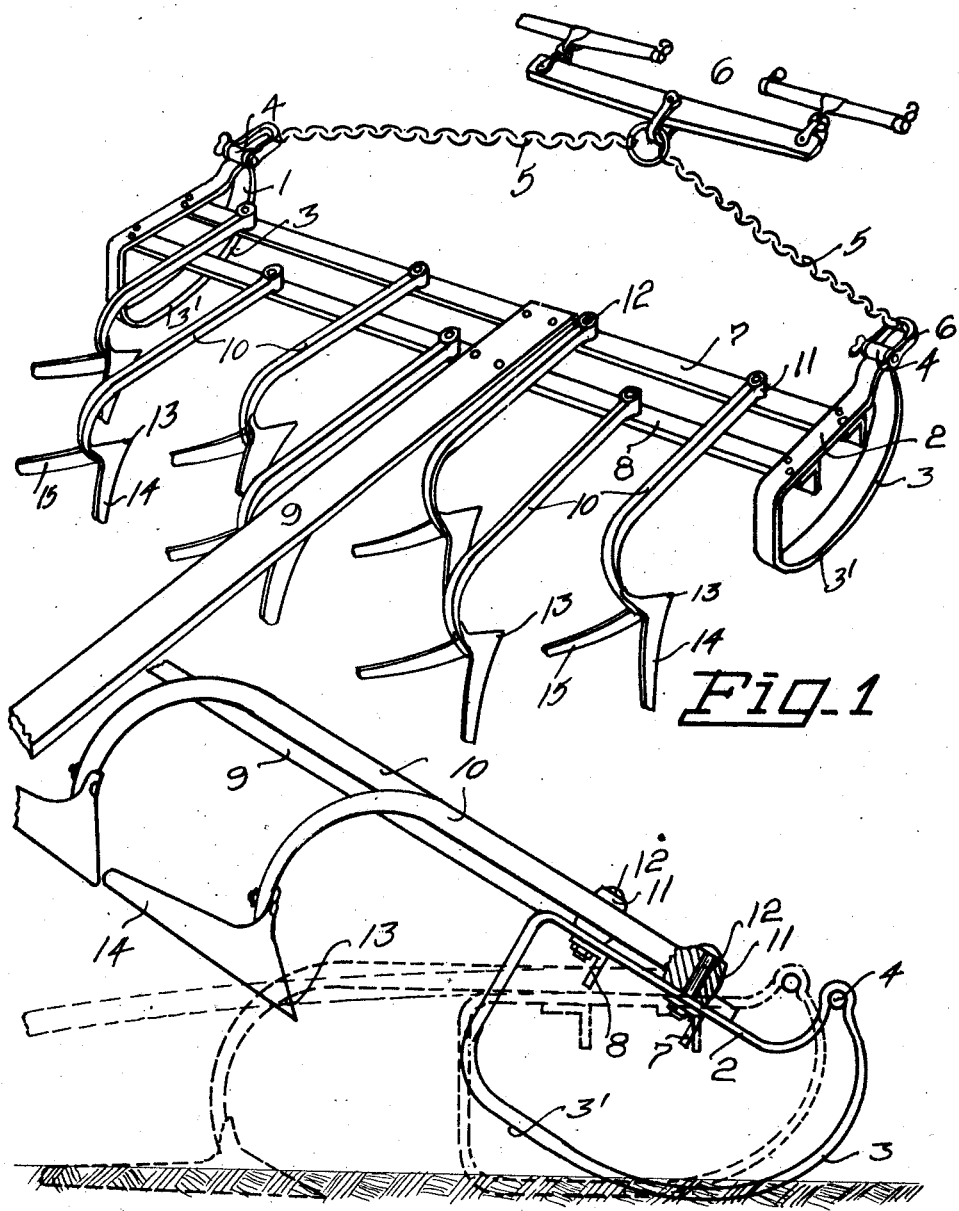

1,627,038

UNITED STATES PATENT OFFICE.

JOHN J. KEARNS, OF SPOKANE, WASHINGTON.

WEEDING IMPLEMENT.

Application filed February 14, 1925. Serial No. 9,288.

The present invention relates to improvements in weeding implements of the horse drawn type wherein an implement is provided by means of which the soil and subsoil may readily and thoroughly be cleaned of weeds and trash in the cultivation of the soil.

The primary object of the invention is the provision of a weeder similar in nature to a harrow having weeding devices or cutters designed to travel beneath the surface of the soil when in operative position, and to automatically clear themselves of weeds and trash. By the utilization of my invention in mounting the cutters on the implement means are provided for readily avoiding and freeing the cutters from an obstruction to permit progress of the implement without danger of breaking the cutters. And for transportation purposes the implement is so constructed and the horse power hitched thereto in such manner that the forwardly drawn implement will be tilted and the weeding devices elevated from the ground in order that the implement may be transported with the weeding devices in inoperative position.

For accomplishing these purposes I provide certain novel features of construction and combinations and arrangements of parts as will hereinafter be more fully set forth and claimed.

In the accompanying drawings I have illustrated one complete example of the physical embodiment of my invention wherein the parts are combined and arranged according to the best mode I have thus far devised for the practical application of the principles of my invention.

Figure 1 is a perspective view of the implement constructed according to my invention, part of the lever-bar being broken away for convenience of illustration.

Figure 2 is an enlarged detail view in side elevation showing in the dotted line position the operation of the implement and in full lines the position of the implement for transportation.

In carrying out my invention I utilize a rigid frame to be dragged or hauled over the ground, comprising a pair of spaced sleds or traction devices as 1 and 2, preferably made up of flat bars of metal which are fashioned by suitable machines or tools in the shapes shown with a flat attaching bar at the top and a rounded or curved runner 3. The rear end 3' of the runner is substantially flat for travel over the ground while the front portion which is curved upwardly provides a rocking surface for the sled.

The runner portion 3 which curves upwardly and to the front of the sled terminates in an eye 4 located above the plane of the top flat bar of the sled, and somewhat to the rear of the front projection of the runner. The diverging draft chains 5 are attached to these eyes by means of clevises 6 as usual, and a pair of horses are hitched to the single trees 6 for drawing or dragging the implement forward on the sleds.

The spaced sleds which stand in upright vertical position are connected by a pair of transverse, parallel angle iron bars 7 and 8 which at their ends are attached at the under sides of the upper flat bars of the sleds by rivets or bolts to form a rigid structure or frame for the implement upon which is supported the weeding devices.

Located at the longitudinal center of the implement is a rearwardly extending board 9 bolted to the two transverse bars, and designed to perform the functions of a lever bar, which, when weight is applied thereto will rock the implement on its runners from full line position to dotted line position in Figure 2, and hold the implement in the position of Figure 1. As the eyes 4 of the sleds are located above the main or body portions of the sleds, it will be apparent that when power is applied to these eyes through the draft devices, the sleds will be rocked on their runners to full line position of Figure 2. In this position the implement is hauled or transported from one field to another, along the highway, or about the barnyard.

To bring the implement to operative position as indicated in Figure 1 and by dotted lines in Figure 2, a load is applied to the lever bar 9 to counterbalance the draft applied to the eyes of the sleds, and this load is usually the weight of the driver who steps upon the lever bar. By taking his position at the proper distance to the rear of the sleds, sufficient leverage is exerted to tilt the implement and hold it in operative position as the implement progresses under power from the horses.

Two sets of weeding devices are carried by the implement frame and as these devices are of similar construction and operation, a description of one will suffice for them all.

The two sets of weeding devices are connected to the two transverse bars 7 and 8 and extend rearwardly therefrom, and each device comprises a beam 10 having a perforated bearing head 11 pivoted by means of a bolt 12 to the selected transverse bar. At their rear ends these beams curve downwardly and have attached thereto in suitable manner the cutters or cutting blades comprising an inclined front cutting edge 13 and two angularly disposed, diverging, horizontal cutting edges or knives 14 and 15.

The beams of the two sets are of substantially the same length in order that the weeding devices of the beams pivoted to the front bar 7 are positioned in advance of the weeding devices carried by the beams pivoted to the rear bar 8. As thus spaced and staggered transversely of the implement it will be apparent that the cutting devices and their beams may swing laterally of the implement on their pivots without interference one from another. Thus should a cutter encounter a stone or other obstruction the beam will be caused to swing laterally on its pivot in order that the cutter may pass around the obstruction, and as the implement advances this cutter will again swing to its normal position.

As indicated in Figure 2 by dotted lines the cutters move through the soil just beneath its surface for the purpose of cutting out the roots of the weeds and trash, and to some extent turning up the soil. The diverging cutting blades 14 and 15 of the cutters tend to guide the weeds outwardly therefrom and in the action of these blades the weeds are passed to the rear and freed from the cutters.

The depth of penetration of the cutters in the soil may be governed by the location of the weight of the driver on the lever bar. By moving toward the front of the implement the leverage is decreased and the penetration may be slight while by taking a step or two to the rear on the board 9 the leverage is increased and the penetration of the cutters is consequently increased. By thus shifting his position the driver can readily change the relation of the implement to the surface of the soil and permit the implement to rock on the sleds as a fulcrum to desired position.

Having thus fully described my invention, what I claim as new and desire to secure by Letters Patent is—

1. The combination with a rigid frame comprising sleds having runners adapted to perform the functions of fulcrums, draft means attached to said sleds at a point whereby the frame will be tilted forwardly, a lever bar fixed on the frame adapted to receive a weight for tilting the frame rearwardly, a plurality of longitudinally disposed beams pivoted on said frame to swing laterally, cutting devices on the beams, and means whereby said cutting devices are located in staggered position transversely of the implement.

2. The combination with spaced sleds and a front and rear transversely disposed bar rigidly connecting said sleds, of two sets of beams of substantially the same length, pivotal connections for said beams on said bars whereby the beams are permitted to swing laterally of the implement, and the beams of one set alternating with the beams of another set in their pivotal arrangement on said bars.

In testimony whereof I affix my signature.

JOHN J. KEARNS.